E. W. T & R. S. G. FRODIGH.
TAG STRINGING MACHINE.
APPLICATION FILED SEPT. 30, 1912.
1,102,259.
Patented July 7, 1914.
6 SHEETS—SHEET 1.
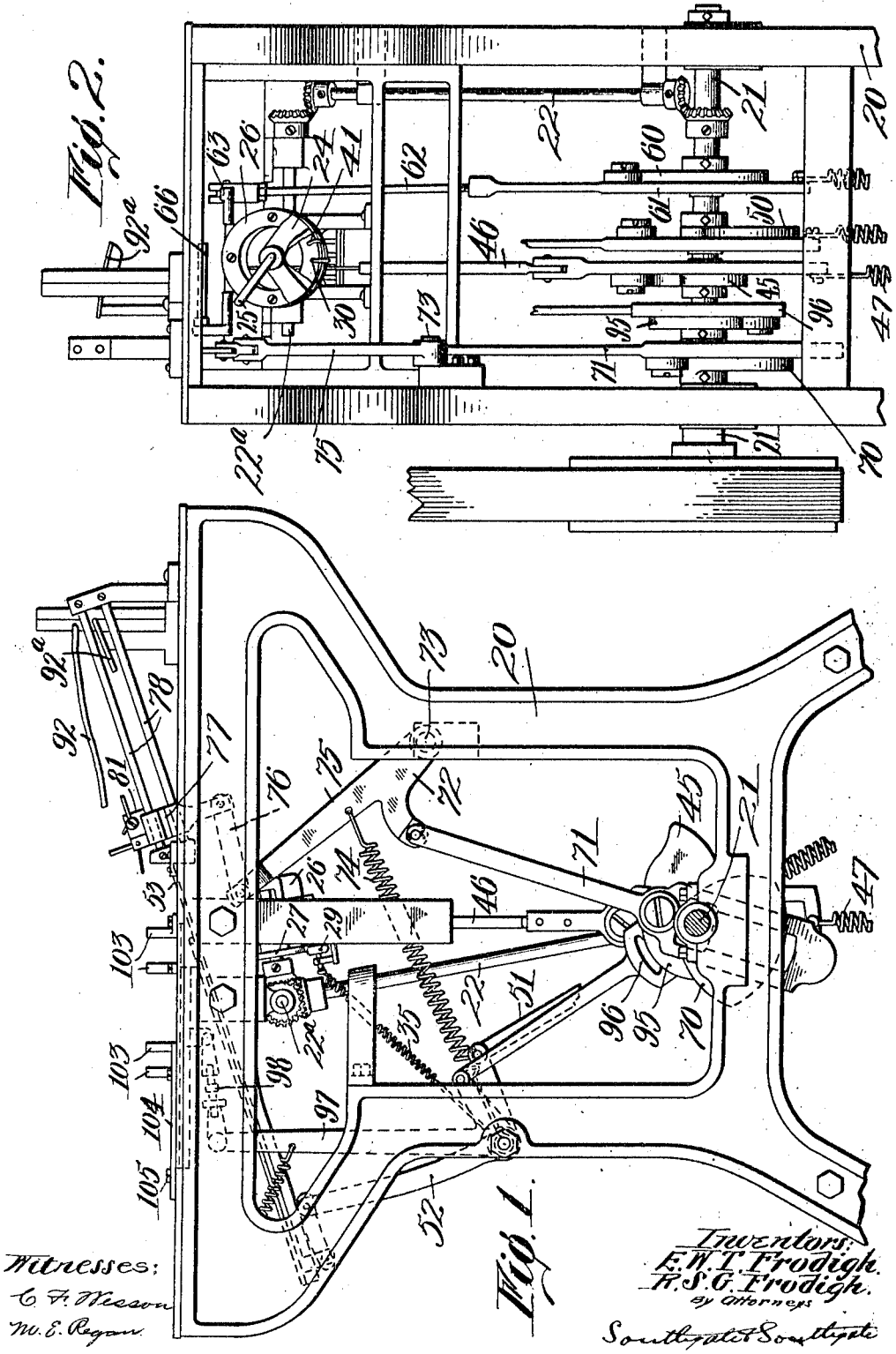

Fig. 3.

E. W. T & R. S. G. FRODIGH.
TAG STRINGING MACHINE.
APPLICATION FILED SEPT. 30, 1912.
1,102,259.
Patented July 7, 1914.
SHEETS—SHEET 3.
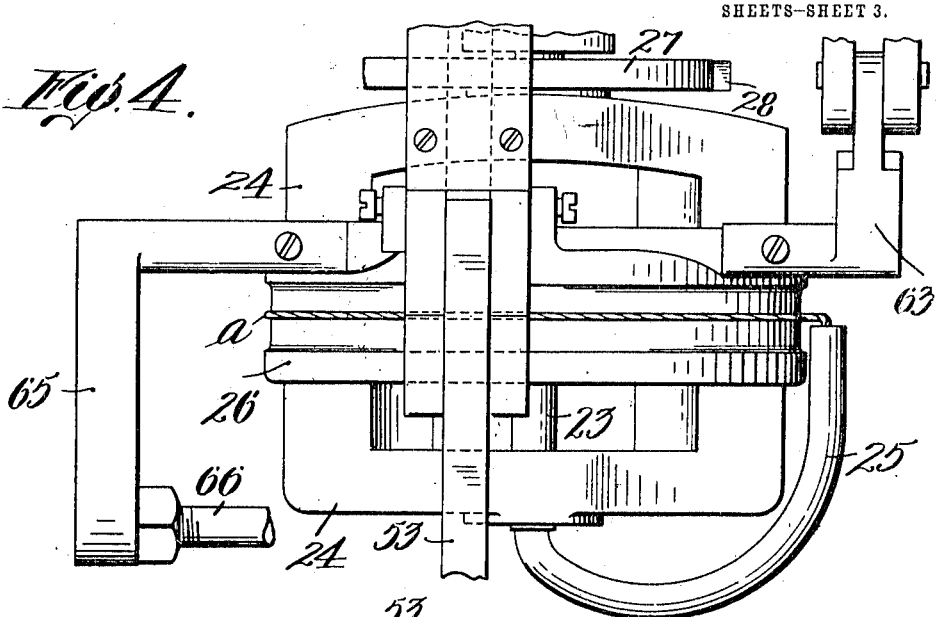
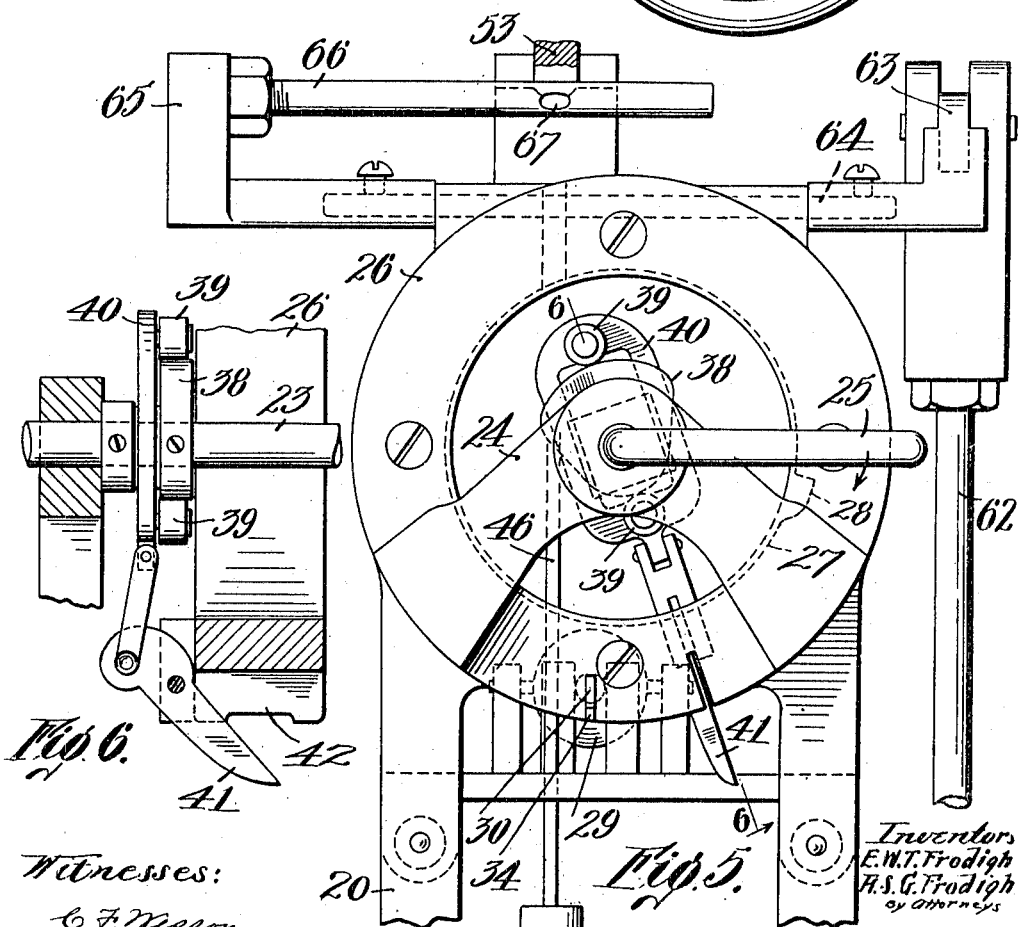

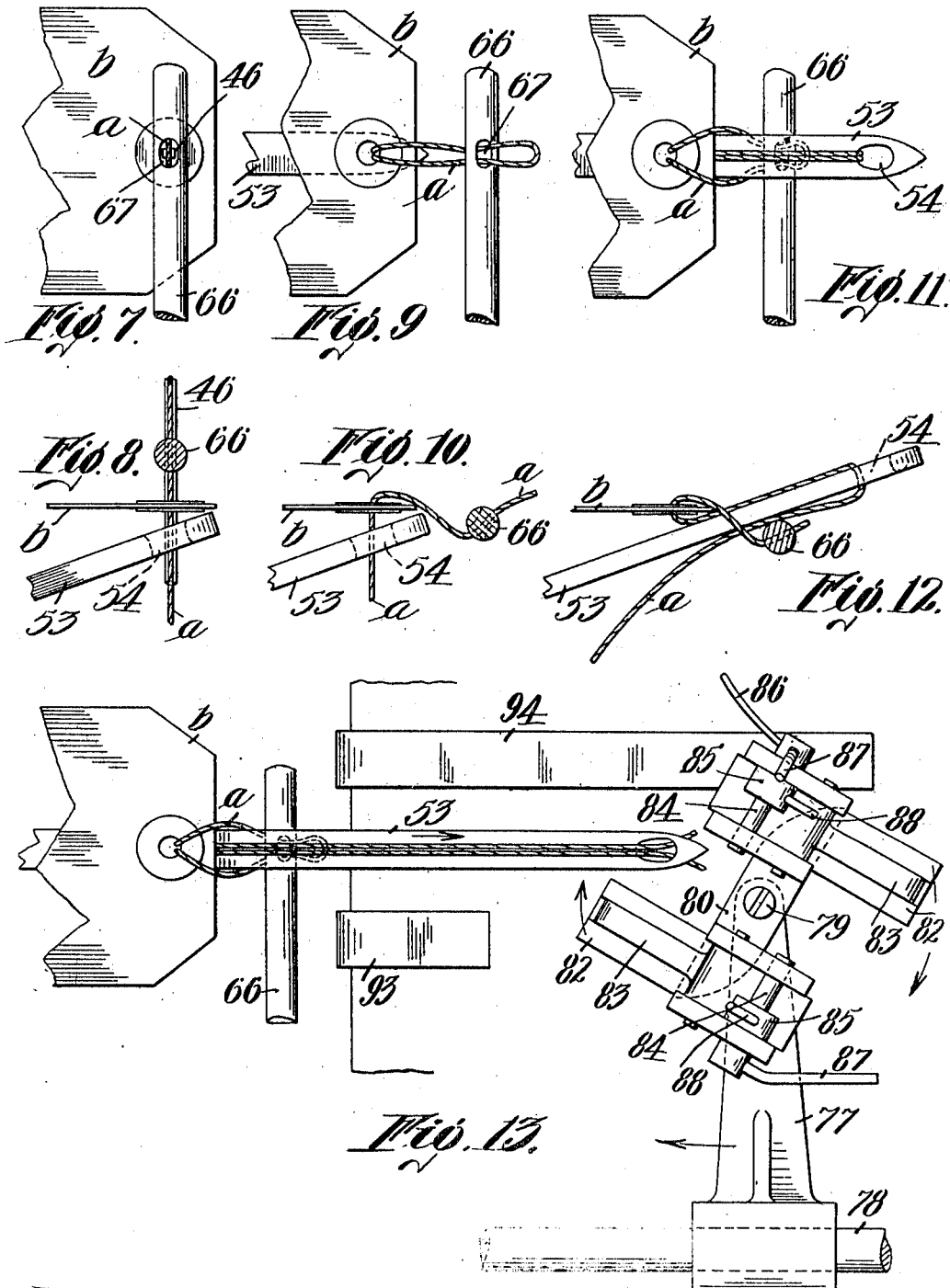

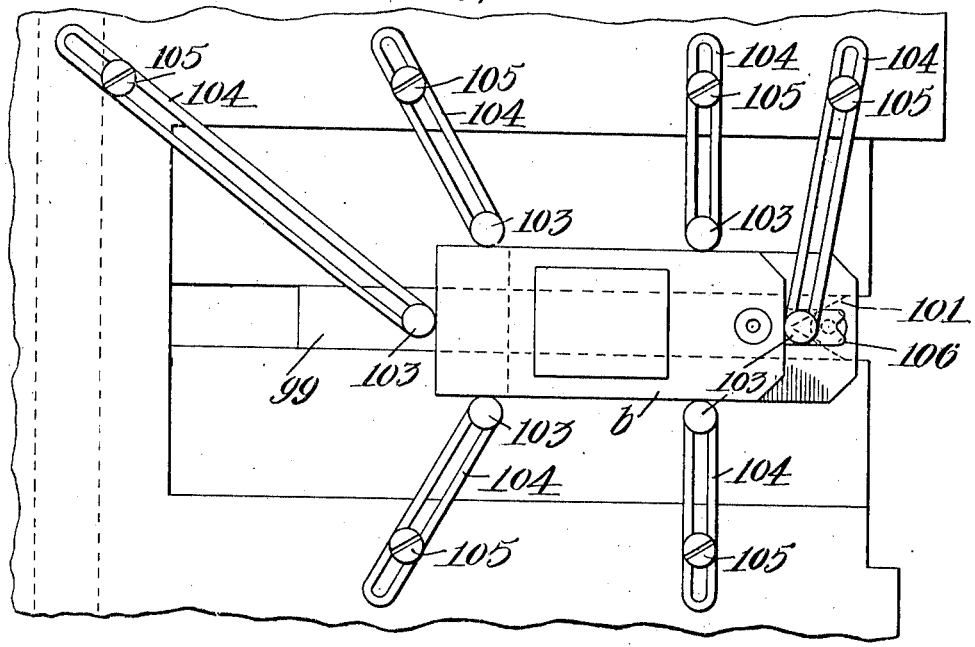
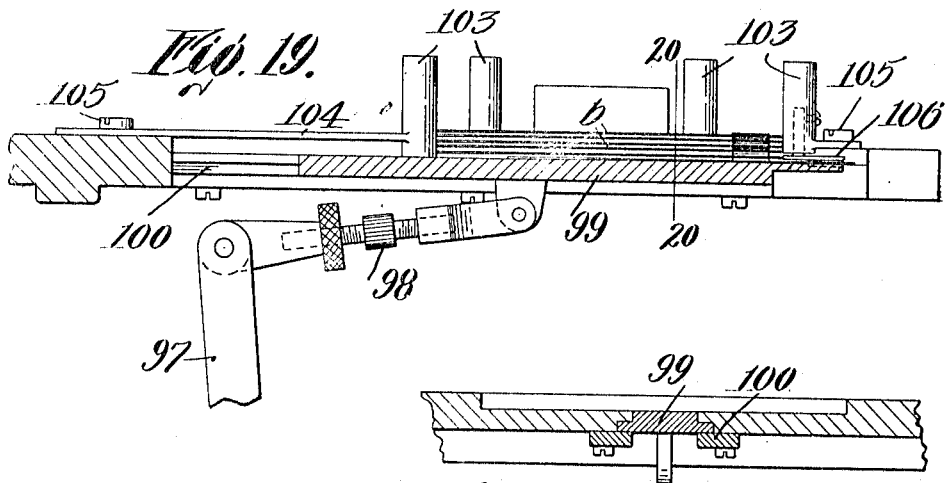

UNITED STATES PATENT OFFICE.

ERNEST W. T. FRODIGH AND ROLAND S. G. FRODIGH, OF WORCESTER, MASSACHUSETTS.

TAG-STRINGING MACHINE.

1,102,259.   Specification of Letters Patent.   Patented July 7, 1914.

Application filed September 30, 1912. Serial No. 723,034.

*To all whom it may concern:*

Be it known that we, ERNEST W. T. FRO-DIGH and ROLAND S. G. FRODIGH, citizens of the United States, both residing at Worcester, in the county of Worcester and State of Massachusetts, have invented a new and useful Tag-Stringing Machine, of which the following is a specification.

This invention relates to a machine for stringing tags, and the principal objects thereof are to provide an exceedingly simple and practicable machine for this purpose, and particularly to provide an efficient string feeding device, an improved arrangement for drawing the string from the feeding device and stringing it through the tag in such a way as to leave it tied in proper position thereon, and to provide an improved arrangement for holding and feeding the tags.

The invention also involves improvements in various elements connected with the above mentioned devices and the features of construction thereof.

Figure 14:
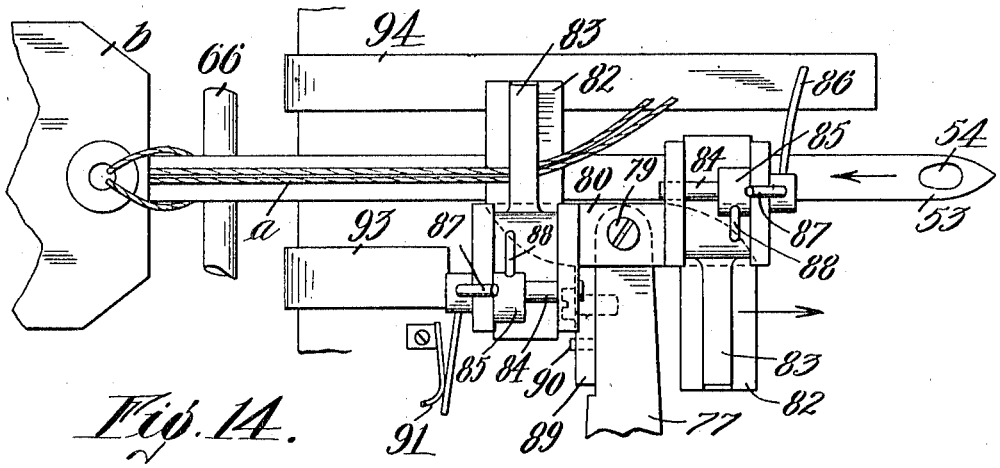
Figure 15:
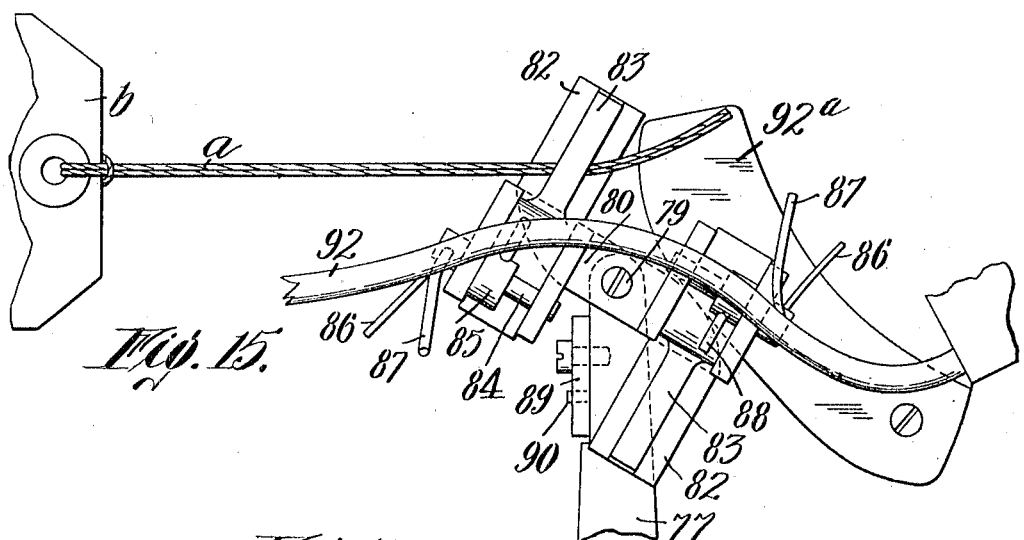
Figure 16:
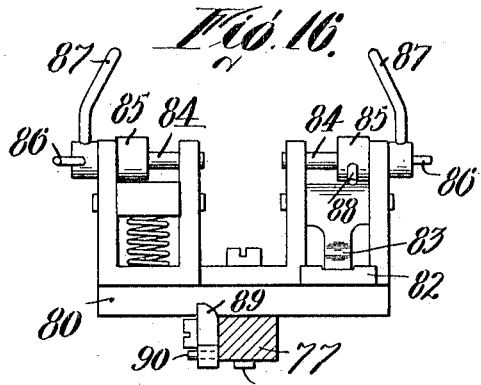
Figure 17:
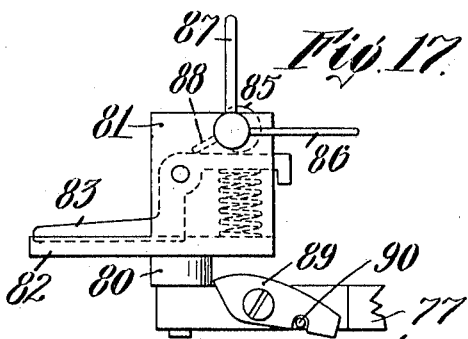

Reference is to be had to the accompanying drawings in which,

Figure 1 is a side view of a machine constructed in accordance with this invention; Fig. 2 is an end view thereof; Fig. 3 is a side elevation of the string feeding device on enlarged scale with parts shown in section; Fig. 4 is a plan of the same; Fig. 5 is an end view thereof; Fig. 6 is a sectional view on the line 6—6 of Fig. 5; Fig. 7 is a plan of a tag in position for receiving the string; Fig. 8 is a central longitudinal vertical sectional view of the same; Fig. 9 is a view similar to Fig. 7 showing the next step in the operation; Fig. 10 is a longitudinal vertical sectional view of the same through the center; Fig. 11 is a view similar to Fig. 9 showing the next step; Fig. 12 is a central longitudinal vertical sectional view of the same; Fig. 13 is a plan of a portion of the mechanism showing the next step and also the gripping device; Fig. 14 is a similar plan showing the next step in the operation; Fig. 15 is a similar plan showing the last step of the stringing operation; Fig. 16 is a side view of the rotary grippers; Fig. 17 is an end view thereof; Fig. 18 is a plan of the tag hopper; Fig. 19 is a longitudinal central sectional view of the same, and Fig. 20 is a sectional view on the line 20—20 of Fig. 19 with parts omitted.

The invention is illustrated in a form in which the parts are mounted on a frame 20 provided with a horizontal main driving shaft 21. This shaft by means of bevel gears or the like drives a shaft 22 which extends toward the top of the machine and in turn through a horizontal shaft 22ª drives a shaft 23 which is hollow and is mounted in stationary bearings on a bracket 24 on the frame. On one end of the hollow shaft 23 is fixed a tubular rotary feed guide 25 which is provided with a longitudinal passage communicating with the interior of the shaft 23. This feed guide or tube is bent around from the end which is connected with the shaft 23 to a point at the opposite end which is brought back to a position parallel with the shaft 23. The end of this guide is open and it will be obvious that the rotation of the shaft 23 will swing this discharge end of the rotary feed guide around in a circle.

Mounted on the bracket 24 is a stationary drum 26 having a circumferential groove around which the discharge end of the feed guide rotates. The string *a* which is to be used for stringing the tags is drawn into one end of the hollow shaft 23 and along the rotary feed guide so as to project therefrom. As the feed guide rotates it is designed to lay this string in the groove of the drum.

In order to hold the free end of the string and cause the string to be fed along as the tubular guide 25 rotates, the following mechanism is shown. On the shaft 23 is a binder cam 27 provided with a projection 28 which once during each revolution engages a projection or member 29 on a binder lever 30. This lever is provided with a roughened surface 33 for entering a notch 34 in the stationary drum 26 to grip the string and hold it. A spring 35 is provided for actuating the binder, the cam projection 28 being provided for the purpose of releasing the binder and allowing the string to be fed forward from the drum after it has been laid thereon by the rotary feed guide, and to allow the feed guide to pass it. Immediately thereafter the binder comes into operation again. The string is cut also once during each revolution of the feed guide and the following mechanism is shown for that purpose. On the shaft 23 is a knife cam 38 operating between rollers 39 on a yoke 40 which is connected by a link with a pivoted knife blade 41. This knife blade is adapted to coöperate drum 26 and to enter a slot at the side thereof. There being one projection only on the cam 38, the knife blade will operate to cut the string once during each revolution of the rotary feeding guide. The cam is designed to cause the string to be cut just after the feed guide passes the cutter. The next operation after the string has been laid on the stationary drum and cut, is to push it therefrom while the binder is released. This is accomplished by means of a needle cam 45 on the shaft 21 operating a needle 46 in opposition to a spring 47. The needle is caused to reciprocate by this cam in a passage 48 extending vertically through the slanting drum 26. The operation of this cam therefore projects the end of the needle upwardly above the top of this drum. This needle is provided with a notch in the end so it will receive the string and poke it up from the surface of the drum for the purpose of removing it from the drum and inserting it in a tag.

On the shaft 21 is a cam 50 (which we designate the shuttle cam) operating a yielding member 51 which in turn operates a bell-crank 52 to oscillate one arm of said bell-crank and reciprocate a long inclined shuttle 53. This shuttle is provided with an eye 54 therethrough and the cam is so designed and timed, that when the needle projects upwardly from the drum, it passes through this eye which is stationary at that time. The tag $b$ to be strung is located, by means which will be described hereinafter, in such position that the needle passes directly upwardly through the eyelet therein. (See Figs. 7 and 8.)

On the shaft 21 is another cam 60 which operates a yoke 61 against the resistance of a spring and reciprocates a rod 62 that is connected at the end of an arm 63 on an oscillatable shaft 64 mounted on the stationary drum. This shaft has another arm 65 at the end of which is a cylindrical guide 66 provided with an eye 67 therethrough. This cam 60 is so designed that when the parts are in the position described in the last paragraph the eye of the guide 66 is in stationary position directly over the eye 54 so that the needle, eye 54, eyelet and eye 67 are in alinement. Thus the needle passes through the eye 67 and passes a material distance above the guide 66 far enough to leave sufficient string projecting through the eye to assure its not being entirely pulled out by the subsequent operations. It is immediately withdrawn, leaving the string in the position shown in Fig. 8. Just as soon as the needle is withdrawn through the guide 66, the latter swings with the oscillation of the shaft 64 to the position shown in Figs. 9 and 10. This leaves the two strands of the string slightly separated, as shown in Fig. 9, so that the nose of the shuttle 53 can enter between them. The cam 50 now comes around toward its highest position and the shuttle 53 is projected forward between the two strands and also between the tag and the guide 66. This operation is shown in Figs. 11 and 12. Fig. 13, however, shows the completion of this operation in which the shuttle 53 is moved forward so far as to draw the severed ends of the string out from the eye thereof.

On the shaft 21 is another cam 70 (which we call the slide cam) operating a yoke 71 which is pivoted to a lever 72 that is adjustably fulcrumed at 73 to the frame. This lever is operated in one direction against the cam by a spring 74 and has another arm 75 connected by a link 76 with a slide 77 adapted to move on guides 78 on the upper part of the machine. These guides are shown inclined so as to be parallel with the direction of motion of the shuttle. On this slide is a vertical stud 79 on which is pivoted a member 80 having opposite cam surfaces. At the two ends of this member are located a pair of frames 81 each fixed on the member 80 and each provided with a jaw 82. Pivoted on each frame 81 is a jaw 83 operated by a spring 83ª and adapted to coöperate with the jaw 82 and also on each frame 81 is a shaft 84 having a cam 85 thereon and two arms, an opening arm 86 and a release arm 87. The cam 85 is provided with a stop 88 also. Mounted on the slide 77 is a pivoted detent 89, having a stop pin 90. By the mechanism which has just been described, this slide is caused to move back and forth along the guides 78. The shuttle 53 moves past the slide 77, as shown in Fig. 14, and engages the member 80, lining it up with itself. This swings one of the jaws 82 around under the string, as shown in Fig. 14, and upon the further motion of the slide upwardly, the arm 87 on that side is operated by a fixed wire cam 91, to turn the shaft 84 and allow the spring to close the jaw 83 on the string. Now upon further upward motion of the slide, the string will be drawn positively by the moving jaws, the control by the shuttle having been lost as the ends of the string were withdrawn out of the eye thereof. However, the shuttle still has a function as it holds the slide in the position shown in Fig. 14. When the member 80 moves beyond that position the opening arm 86 is operated by a cam 92 in opposition to the spring 83ª to open the jaw 83 and the member 80 comes into engagement with another fixed cam 92ª, which is in position to be engaged by the end of the member 80 and to turn the latter end for end, as shown in Fig. 15 so as to bring the other pair of jaws around into position ready to operate on the next reciprocation of the slide. The gripping jaws move along flat guides or tracks 93 and 94. It will be seen, therefore, that the jaws act to complete the fastening of the string in a positive manner and are left in position for the next operation. The detent 89 is for the purpose of preventing backward motion of the rotary gripping jaws.

On the shaft 21 is still another cam 95 operating a yoke 96 having an arm connected with the bell-crank 97 which by an adjustable connection 98 operates a tag slide 99. This tag slide runs in ways 100 on a stationary part of the frame and is provided with a V-shaped opening 101 for the purpose of engaging the eyelet on the tag b. It is located at the bottom of a pile of tags in the tag feed hopper. This hopper is preferably composed of a series of posts 103 each on a slotted horizontal base 104 adapted to be held by a headed screw 105. In this way the posts can be adjusted to any desired position to receive tags of any size and the operation of the slide results in moving the tags out into the position shown in Figs. 7 and 8 under a foot 106 adjustably mounted on the front post.

It will be understood of course, that while the details of the cams for operating these parts have not been described minutely, that the design thereof is a matter within the skill of any competent mechanic or draftsman and that the necessary forms can be ascertained by reference to the order of steps as set forth therein, and that any other means for producing such motions can be employed within the scope of this invention. Although we have illustrated and described a preferred embodiment of the invention, we are aware of the fact that the objects can be carried out in other ways with modifications of construction without departing from the scope of the invention as expressed in the claims. Therefore, we do not wish to be limited in these respects, but What we do claim is:—

1. In a machine of the character described, the combination of a stationary drum, a hollow shaft extending therethrough, and a hollow feed guide on the end of the shaft for receiving a flexible member directly from the shaft and adapted to rotate therewith and having an end projecting radially over the edge of the drum.

2. In a machine of the character described, the combination of a circular member having a groove therearound, a hollow shaft extending through said circular member, and a feed guide on the end of said shaft projecting into a position parallel therewith and adjacent to said groove, whereby a string can be led through said hollow shaft and guide and laid in said groove by the rotation thereof.

3. In a machine of the character described, the combination of a drum, a hollow shaft extending through the drum, means at one side of the drum for driving said shaft, and a feed guide on the end of said shaft opposite said means projecting into a position parallel therewith and adjacent to the edge of said drum for laying a string on the surface of the drum.

4. In a machine of the character described, the combination of a circular drum, means for drawing a string through said drum and laying it around the drum, and a binder for engaging the drum and holding the end of the string.

5. In a machine of the character described, the combination of a fixed circular drum, a hollow rotary shaft extending axially therethrough, a feed guide fixed to the end of said shaft and terminating near the circumference of said drum, said guide being adapted to rotate around the drum and lay a string thereon, a movable binder for engaging said string, and means on said shaft for holding the binder back from the string.

6. In a machine of the character described, the combination of a circular drum, a feed guide terminating near the circumference of said drum, said guide being adapted to rotate around the drum and lay a string thereon, a movable binder for engaging said string, and means for holding the binder back from the string.

7. In a device of the character described, the combination of a circular drum, a guide terminating near the surface of the drum and adapted to encircle it for the purpose of laying a string upon it, a lever having a roughened surface, a spring for swinging said lever in position for the roughened surface to engage said drum to bind the string thereon, and means for swinging the lever back into inoperative position.

8. In a device of the character described, the combination of a circular drum, a hollow rotary shaft extending therethrough and having a tube on the end terminating near the surface of the drum and adapted to encircle it for the purpose of laying a string upon it, a cam on said shaft, a lever having a roughened surface, a spring for swinging said lever in position for the roughened surface to engage said drum to bind the string thereon, and means on the lever for engaging the cam as the cam rotates and swinging the lever back into inoperative position.

9. In a machine of the character described, the combination of a circular drum having a circumferential groove, means for drawing a string through said drum and laying it around the drum, in the groove, a binder for engaging the drum and holding the end of the string, and means for cutting off the string.

10. In a machine of the character described, the combination of a circular drum having a circumferential groove, means for drawing a string through said drum and laying it around the drum in the groove, a binder for engaging the drum and holding the end of the string, a cam on said shaft, and a pivoted knife blade on said drum connected with and operated by said cam, said drum having a slot for receiving the knife blade, said slot being provided with a cutting edge for coöperating therewith.

11. In a device of the character described, the combination of a circular drum, a feed tube terminating near the circumference of said drum, said tube being adapted to conduct a string therethrough, means for rotating said tube to lay the string on the drum, means for engaging the end of the string and holding it on the drum, means for cutting off the string before a complete rotation is made, and means for thereafter releasing the holding means to permit the string to be withdrawn from the drum and the feed tube to rotate past the holding means.

12. In a device of the character described, the combination of a fixed circular drum, a hollow rotary shaft extending therethrough, means for rotating the shaft, said shaft having a feed tube on the end thereof terminating near the circumference of said drum, said shaft and tube being adapted to conduct a string therethrough, means for rotating said shaft and tube to lay the string on the drum, means for engaging the end of the string and holding it on the drum, means operated by said shaft for cutting off the string when a complete rotation is made, and means on the shaft for thereafter releasing the holding means to permit the string to be withdrawn from the drum and the feed tube to rotate past the holding means, said means being constructed and adapted to operate to permit the holding means to again engage the drum after the feed tube passes.

13. In a device of the character described, the combination of a fixed circular drum, a hollow rotary shaft extending therethrough, means for rotating the shaft, said shaft having a feed tube on the end thereof terminating near the circumference of said drum, said shaft and tube being adapted to conduct a string therethrough, means for rotating said shaft and tube to lay the string on the drum, a binder for engaging the end of the string and holding it on the drum, means operated by said shaft for cutting off the string when a complete rotation is made, means on the shaft for thereafter releasing the binder to permit the string to be withdrawn and the feed tube to rotate past the binder, said means being constructed and adapted to operate to permit the binder to again engage the drum after the feed tube passes, and means passing through the drum for engaging the string thereon and removing it from the drum after the end is cut and while the binder is in inoperative position.

14. In a device of the character described, the combination of a circular drum, a feed tube terminating near the circumference of said drum, said tube being adapted to conduct a string therethrough, means for rotating said tube to lay the string on the drum, a binder for engaging the end of the string and holding it on the drum, means for cutting off the string when a complete rotation is made, means for thereafter releasing the binder adapted to operate to permit the binder to again engage the drum after the feed tube passes, and means for engaging the string thereon and removing it from the drum after the end is cut and while the binder is in inoperative position.

15. In a machine of the character described, the combination of a circular drum having a circumferential groove, means for drawing a string through said drum and laying it around the drum in the groove, a binder for engaging the drum and holding the end of the string, and means passing through the drum for engaging a string laid thereon and removing it laterally therefrom.

16. In a machine of the character described, the combination of a stationary drum, rotary means for laying a string on the circumference thereof, means for cutting off the string when a length has been laid on the drum, and a reciprocable needle having a notch in the end movable through the drum for engaging the string between its ends after it is cut off and pushing it from the drum.

17. In a machine of the character described, the combination of a stationary drum, rotary means for laying a string on the circumference thereof, means for cutting off the string when a length has been laid on the drum, a reciprocable needle having a notch in the end movable through the drum for engaging the string midway between its ends after it is cut off and pushing it from the drum, a reciprocable shuttle having an eye therethrough, and means for moving said shuttle into position for receiving said needle and string as they move from the drum.

18. In a machine of the character described, the combination of a drum, rotary means for laying a string on the circumference thereof, means for cutting off the string when a length has been laid on the drum, a reciprocable needle for engaging the string after it is cut off and pushing it from the drum, a reciprocable shuttle having an eye therethrough, and means for moving said shuttle into position for receiving said needle and string as they move from the drum.

19. In a machine of the character described, the combination of a drum, rotary means for laying a string on the circumference thereof, means for cutting off the string when a length has been laid on the drum, a reciprocable needle having a notch in the end for engaging the string after it is cut off and pushing it from the drum, a reciprocable shuttle having an eye therethrough, means for moving said shuttle into position for receiving said needle and thread as they move from the drum, and means for moving a tag into position for the eyelet thereof to register with the eye of the shuttle and to receive said needle.

20. In a machine of the character described, the combination of a drum, means for laying a string on the circumference thereof, means for cutting off the string when a length has been laid on the drum, a reciprocable needle having a notch in the end for engaging the string after it is cut off and pushing it from the drum, a reciprocable shuttle having an eye therethrough, means for moving said shuttle into position for receiving said needle and string as they move from the drum, means for moving a tag into position for the eyelet thereof to register with the eye of the shuttle and to receive said needle, a movable guide having a perforation therethrough, and means for moving said guide into a position in which its eye will register with the eye in the shuttle and the eyelet in the tag so as to receive said needle.

21. In a machine of the character described, the combination of a reciprocable needle having a notch in the end for engaging a string, a reciprocable shuttle having an eye therethrough, means for moving said shuttle into position for receiving said needle and string, means for moving a tag into position for the eyelet thereof to register with the eye of the shuttle and to receive said needle, a movable guide having a perforation therethrough, and means for moving said guide into a position in which its eye will register with the eye in the shuttle and the eyelet in the tag so as to receive said needle.

22. In a tag stringing machine, the combination of an eye, a guide having an eye, means for moving a tag into position, a string-carrying needle, means for moving said needle through the eye in the shuttle, the eyelet of the tag, and the eye in the guide and withdrawing the needle from the guide, means for thereafter moving said guide beyond the end of the tag and shuttle, and means for thereafter projecting the shuttle forwardly between the tag and guide and between the two strands of the string.

23. In a tag stringing machine, the combination of a shuttle having an eye, a movable guide having an eye, means for moving said shuttle and guide into a position in which said eyes register with each other, means for moving a tag into a position in which the eyelet thereof registers with both of said eyes, a string-carrying needle, means for moving said needle through the eye in the shuttle, the eyelet, and the eye in the guide in succession and withdrawing the needle from the guide, means for thereafter moving said guide beyond the end of the tag and shuttle, and means for thereafter projecting the shuttle forwardly between the tag and guide and between the two strands of the string.

24. In a tag stringing machine, the combination of a reciprocable shuttle having an eye, a movable guide having an eye, means for moving said shuttle and guide into a position in which said eyes register with each other, means for moving a tag into a position in which the eyelet thereof registers with both of said eyes, a string-carrying needle, means for moving said needle through the eye in the shuttle, the eyelet, and the eye in the guide in succession and withdrawing the needle from the guide, means for thereafter moving said guide beyond the end of the tag and shuttle, and means for thereafter projecting the shuttle forwardly between the tag and guide and between the two strands of the string until the free ends of the string are drawn out of the eye in the shuttle and for thereafter withdrawing the shuttle.

25. In a tag stringing machine, the combination of a shuttle having an eye, means for threading the loop of a double string through said eye and through the eyelet of a tag, a movable guide for receiving said loop therethrough, means for moving said guide with the loop therein into a position beyond the ends of the tag and shuttle, and means for projecting the shuttle between the two strands of the thread and between the tag and guide.

26. In a tag stringing machine, the combination of means for passing a looped string through the eyelet of a tag, a movable member having an eye for receiving the loop of the string after it is passed through the eyelet, means for moving said movable member beyond the end of the tag with the loop, and means for then passing the string on the other side of the tag forward through the loop.

27. In a tag stringing machine, the combination of means for passing a looped string through the eyelet of a tag, a movable member having an eye, means for moving the movable member into position for the eye to receive the loop of the string after it is passed through the eyelet, means for moving said movable member beyond the end of the tag with the loop, and means for then passing the string on the other side of the tag forward through the loop, between the tag and the first named means and drawing the free ends of the string through the loop to tie the string to the tag.

28. In a machine for stringing tags, the combination of a reciprocable needle for passing a looped string through the eyelet of a tag, a member having an eye, means for oscillating said member to bring the eye into position for receiving said needle when it passes through the eyelet, means for withdrawing the needle, and means for thereafter oscillating said member through an arc into a position beyond the end of the tag.

29. In a machine for stringing tags, the combination of a reciprocable needle for passing a looped string through the eyelet of a tag, an oscillatable member having an eye, means for swinging said oscillatable member to bring its eye into position for receiving said needle when it passes through the eyelet, means for withdrawing the needle, means for thereafter oscillating said member into a position beyond the end of the tag, and means for then passing the free ends of the string through the loop thereof beyond the end of the tag.

30. In a tag stringing machine, the combination of means for passing a looped string through the eyelet of a tag, a movable member having an eye for receiving the loop of the string after it is passed through the eyelet, means for moving said movable member beyond the end of the tag with the loop, means for then passing the string on the other side of the tag forward through the loop, until the free ends of the string pass through the loop.

31. In a machine for stringing tags, the combination of a needle for passing a looped string through the eyelet of a tag, a member having an eye, means for moving the second member to bring the eye into position for receiving said needle when it passes through the eyelet, means for withdrawing the needle, means for thereafter moving the second member beyond the end of the tag, means for then passing the free ends of the string through the loop thereof beyond the end of the tag, and means for gripping the free ends of the string and drawing the string taut against the tag.

32. In a tag stringing machine, the combination with means for drawing the looped end of a string through the eyelet of a tag, of a reciprocable shuttle having an eye adapted to pass with the free ends of the string through the loop, and a movable gripper for engaging the string on the shuttle.

33. In a tag stringing machine, the combination with means for drawing the looped end of a string through the eyelet of a tag, means for passing the free ends of the string through the loop on the other side of the tag, of means for engaging said free ends and drawing them taut to bind the loop against the edge of the tag, the said second means comprising a reciprocable shuttle having an eye adapted to pass with the free ends of the string through the loop, and the third means comprising a movable gripper for engaging the string on the shuttle.

34. In a tag stringing machine, the combination with means for drawing the looped end of a string through the eyelet of a tag, means for passing the free ends of the string through the loop on the other side of the tag, of means for engaging said free ends and drawing them taut to bind the loop against the edge of the tag, the second means comprising a reciprocable shuttle having an eye adapted to pass with the free ends of the string through the loop, and the third means comprising a movable gripper for engaging the string on the shuttle, a guide parallel with the shuttle for said gripper, and means on the gripper for engaging the shuttle whereby the shuttle will hold the gripper in proper position.

35. In a tag stringing machine, the combination with means for drawing the looped end of a string through the eyelet of a tag, a reciprocable shuttle having an eye adapted to pass with the free ends of the string through the loop, a movable gripper for engaging the string on the shuttle, a guide parallel with the shuttle for said gripper, and means on the gripper for engaging the shuttle whereby the shuttle will hold the gripper in proper position.

36. In a tag stringing machine, the combination with means for passing the loop of a string through the eyelet of a tag, a shuttle for thereafter passing the free ends of the string through the loop thereof, a gripper, and means constructed and arranged to be moved by said shuttle as it reciprocates into a position to bring the gripper into engagement with the string carried by the shuttle.

37. In a tag stringing machine, the combination with means for passing the loop of a string through the eyelet of a tag, a shuttle for thereafter passing the free ends of the string through the loop thereof, a slide movable parallel with the shuttle, a cam pivoted on said slide, and a gripper mounted on said cam, said cam being constructed and arranged to be moved by said shuttle as it reciprocates into a position to bring the gripper into engagement with the string carried by the shuttle.

38. In a tag stringing machine, the combination with means for passing the loop of a string through the eyelet of a tag, a shuttle for thereafter passing the free ends of the string through the loop thereof, a slide movable parallel with the shuttle, a cam pivoted on said slide, a gripper mounted on said cam, said cam being constructed and arranged to be moved by said shuttle as it reciprocates into a position to bring the gripper into engagement with the string carried by the shuttle, said gripper having a pair of jaws, and means adjacent to the shuttle for operating said jaws to grip the string.

39. In a tag stringing machine, the combination with means for passing the loop of a string through the eyelet of a tag, of a reciprocable shuttle for passing the free ends of the string through the looped end thereof on the other side of the tag, a slide movable parallel with the shuttle, a gripper on said slide having a member for engaging the shuttle to move the gripper into position to engage the string on the shuttle, and means for closing the gripper jaws while in that position.

40. In a tag stringing machine, the combination with a shuttle for operating the string, a slide movable parallel with the shuttle, a cam pivoted on said slide, a gripper mounted on said cam, said cam being constructed and arranged to be moved by said shuttle as it reciprocates into a position to bring the gripper into engagement with the string carried by the shuttle, said gripper having a pair of jaws, means adjacent to the shuttle for operating said jaws to grip the string, means for moving the grippers along the shuttle both before and after the string is gripped, and means for then releasing the jaws from the string.

41. In a tag stringing machine, the combination with a shuttle for passing the free ends of a string through the loop thereof, a slide, a cam movably mounted on said slide, a gripper mounted on said cam, said cam being constructed and arranged to be moved by said shuttle as it reciprocates into a position to bring the gripper into engagement with the string carried by the shuttle, said gripper having a pair of jaws, means adjacent to the shuttle for operating said jaws to grip the string, means for moving the grippers along the shuttle, means for releasing the jaws from the string, and means for then withdrawing the shuttle.

42. In a tag stringing machine, the combination with means for forcing the loop of a string through the eyelet of a tag and for moving the free ends of the loop forward, a reciprocable gripper, means for moving said gripper into position to engage the string, means for moving the gripper along parallel with the direction of motion of the string, and means for causing the gripper to grip the string during said motion and to release it at the end of the motion.

43. In a tag stringing machine, the combination with means for moving the free ends of a loop forward, a reciprocable gripper, means for moving said gripper into position to engage the string, means for moving the gripper, means for causing the gripper to grip the string during said motion and to release it at the end of the motion, and means for adjusting the gripper at the end of said motion into position to grip another string on its next reciprocation.

44. In a tag stringing machine, the combination of means for projecting the free ends of a string through a loop thereof, of a slide, a member pivoted on said slide, two pairs of grippers on said member, means for operating the slide, means for bringing one of the grippers into position to register with the string, means for causing said gripper to grip the string at the beginning of its forward motion and to release it at the end thereof, means for then swinging said member to bring the other gripper into position to engage the string on its next reciprocation.

45. In a tag stringing machine, the combination of a slide, a rotatable member carried thereby, two pairs of gripping jaws mounted on the rotatable member, a reciprocable member movable parallel with the slide for engaging said rotatable member and holding it in proper position for operation of one pair of jaws, and a fixed cam for controlling said jaws to grip and release a string or the like.

46. In a tag stringing machine, the combination of a slide, a rotatable member carried thereby, two pairs of gripping jaws mounted on the rotatable member, a reciprocable member movable parallel with the slide for engaging said rotatable member and holding it in proper position for operation of one pair of jaws, a fixed cam for controlling said jaws to grip and release a string or the like during its reciprocation in one direction, and a second stationary cam in position for swinging the other pair of jaws into operative position at the end of the stroke.

47. In a tag stringing machine, the combination of a slide, a rotary member mounted to rotate on an axis transverse to the direction of motion of said slide, two pairs of gripping jaws on said rotary member, each comprising a stationary jaw and an oscillatable one, springs for closing the oscillatable jaws, and a pair of eccentrics for opening them.

48. In a tag stringing machine, the combination of a slide, a rotary member mounted to rotate on an axis transverse to the direction of motion of said slide, a stationary jaw and a movable one on said rotary member, a spring for closing the movable jaw, an eccentric for opening it, having two arms thereon and two stationary cams, one for engaging one arm to turn the eccentric to open the jaw and the other in position to engage the other arm thereafter to turn the eccentric back to permit the spring to close the jaw.

49. In a tag stringing machine, the combination of a slide, a member rotatably mounted thereon, two sets of grippers mounted on said member, means for turning said member to bring the grippers alternately into operative position, and means for preventing the member from turning backward.

In testimony whereof we have hereunto set our hands in the presence of two subscribing witnesses.

ERNEST W. T. FRODIGH.
ROLAND S. G. FRODIGH.

Witnesses to the signature of Ernest W. T. Frodigh:
ALBERT E. FAY,
C. FORREST WESSON.

Witnesses to the signature of Roland S. G. Frodigh:
THOS. J. SMULL,
RALPH L. DONNAN